United States Patent
Mondello et al.

(10) Patent No.: US 11,669,643 B2
(45) Date of Patent: *Jun. 6, 2023

(54) BLOCK CHAIN BASED VALIDATION OF MEMORY COMMANDS

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,462

(22) Filed: Sep. 13, 2021

(65) Prior Publication Data

US 2021/0406407 A1 Dec. 30, 2021

Related U.S. Application Data

(63) Continuation of application No. 16/362,757, filed on Mar. 25, 2019, now Pat. No. 11,120,167.

(51) Int. Cl.
*G06F 21/72* (2013.01)
*H04L 9/32* (2006.01)
(Continued)

(52) U.S. Cl.
CPC ........... *G06F 21/72* (2013.01); *H04L 9/3236* (2013.01); *H04L 9/3247* (2013.01); *G06F 21/76* (2013.01); *H04L 9/50* (2022.05)

(58) Field of Classification Search
CPC .......... G06F 21/72; G06F 21/76; G06F 21/52; G06F 21/64; G06F 3/0622; G06F 3/064;
(Continued)

(56) References Cited

U.S. PATENT DOCUMENTS 10,581,621 B2 3/2020 Bathen et al.
11,120,167 B2 * 9/2021 Mondello ............... G06F 21/64
(Continued)

FOREIGN PATENT DOCUMENTS

JP 2019500799 A 1/2019
KR 10-1712726 B1 3/2017

OTHER PUBLICATIONS

U.S. Appl. No. 15/853,498, entitled, "Physical Unclonable Function Using Message Authentication Code", filed Dec. 22, 2017, 28 pages.
(Continued)

*Primary Examiner* — Christopher A Revak
(74) *Attorney, Agent, or Firm* — Brooks, Cameron & Huebsch, PLLC

(57) ABSTRACT

The present disclosure includes apparatuses, methods, and systems for block chain validation of memory commands. An embodiment includes a memory, and circuitry configured to receive a command that is included in a block in a block chain for validating commands to be executed on the memory, wherein the command includes an anti-replay portion that is based on a previous command included in a previous block in the block chain, validate the command using the anti-replay portion of the command, and execute the command on the memory upon validating the command.

20 Claims, 7 Drawing Sheets

(51) Int. Cl.
*G06F 21/76* (2013.01)
*H04L 9/00* (2022.01)

(58) Field of Classification Search
CPC . G06F 3/0659; G06F 12/1408; H04L 9/3236; H04L 9/3247; H04L 9/50; H04L 9/3239; H04L 63/0823; H04L 63/12; H04L 9/0618; H04L 9/0643; H04L 9/0825; H04L 9/0877; H04L 9/30

See application file for complete search history.

(56) References Cited

U.S. PATENT DOCUMENTS

| | | | |
|---|---|---|---|
| 11,245,514 B1* | 2/2022 | Mao | H04L 9/3239 |
| 2014/0223197 A1 | 8/2014 | Gueron et al. | |
| 2014/0223198 A1 | 8/2014 | Saranghar et al. | |
| 2016/0379015 A1 | 12/2016 | Samsonov et al. | |
| 2019/0013081 A1 | 1/2019 | Blodgett et al. | |
| 2019/0018603 A1 | 1/2019 | Shenoy | |
| 2019/0020471 A1 | 1/2019 | Santilli et al. | |
| 2019/0020661 A1 | 1/2019 | Zhang | |
| 2019/0236286 A1 | 8/2019 | Scriber et al. | |
| 2019/0253257 A1 | 8/2019 | Yan | |
| 2020/0128044 A1* | 4/2020 | Xie | H04L 63/126 |
| 2020/0151350 A1 | 5/2020 | Irazabal et al. | |
| 2021/0209956 A1* | 7/2021 | Allouche | G08G 5/0069 |

OTHER PUBLICATIONS

U.S. Appl. No. 16/201,652, entitled, "Parking Infrastructure Powered By a Decentralized, Distributed Database", filed Nov. 27, 2018, 27 pages.

U.S. Appl. No. 15/993,119, entitled, "Transmission of Vehicle Route Information By Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

International Search Report and Written Opinion from related International Application No. PCT/US2020/024155, dated Jul. 8, 2020, 9 pages.

Wikipedia: Bockchain (database), Aug. 20, 2016, Retrieved from the Internet: https://en.wikipedia.org/w/index.php?title=Blockchain_(database)&oldid=735327455, 9 pages.

* cited by examiner

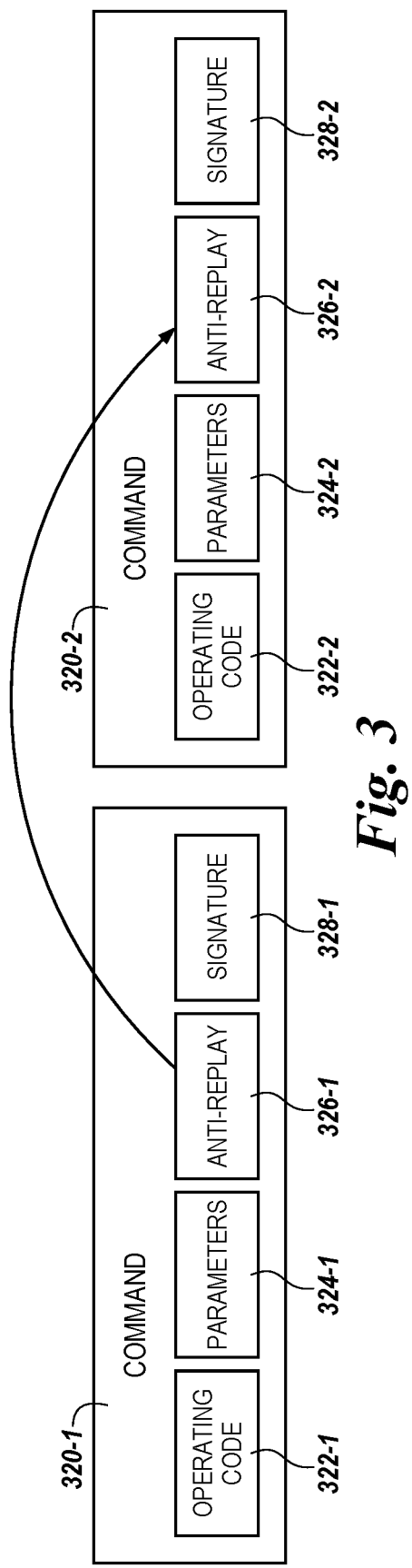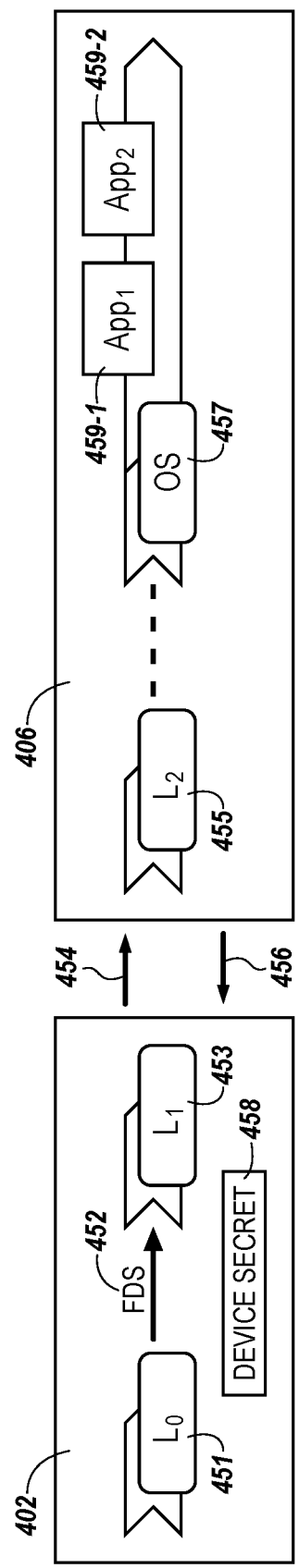
Fig. 3
Fig. 4

BLOCK CHAIN BASED VALIDATION OF MEMORY COMMANDS

PRIORITY INFORMATION

This application is a Continuation of U.S. application Ser. No. 16/362,757, filed on Mar. 25, 2019, which will issue as U.S. Pat. No. 11,120,167 on Sep. 14, 2021, the contents of which are incorporated herein by reference.

TECHNICAL FIELD

The present disclosure relates generally to semiconductor memory and methods, and more particularly, to block chain based validation of memory commands.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the operation of a memory device and/or the data stored in the memory cells of the memory device. Such threats can include, for example, threats from hackers or other malicious users, including man-in-the-middle (MITM) attacks, among others. Such threats can cause significant financial loss, and/or can present significant safety and/or security issues.

BRIEF DESCRIPTION OF THE DRAWINGS

FIG. 3 illustrates an example of commands that can be validated utilizing block chain based validation in accordance with an embodiment of the present disclosure.

FIG. 4 is a block diagram of an example system including a host and a memory device in accordance with an embodiment of the present disclosure.

DETAILED DESCRIPTION

Figure 1:
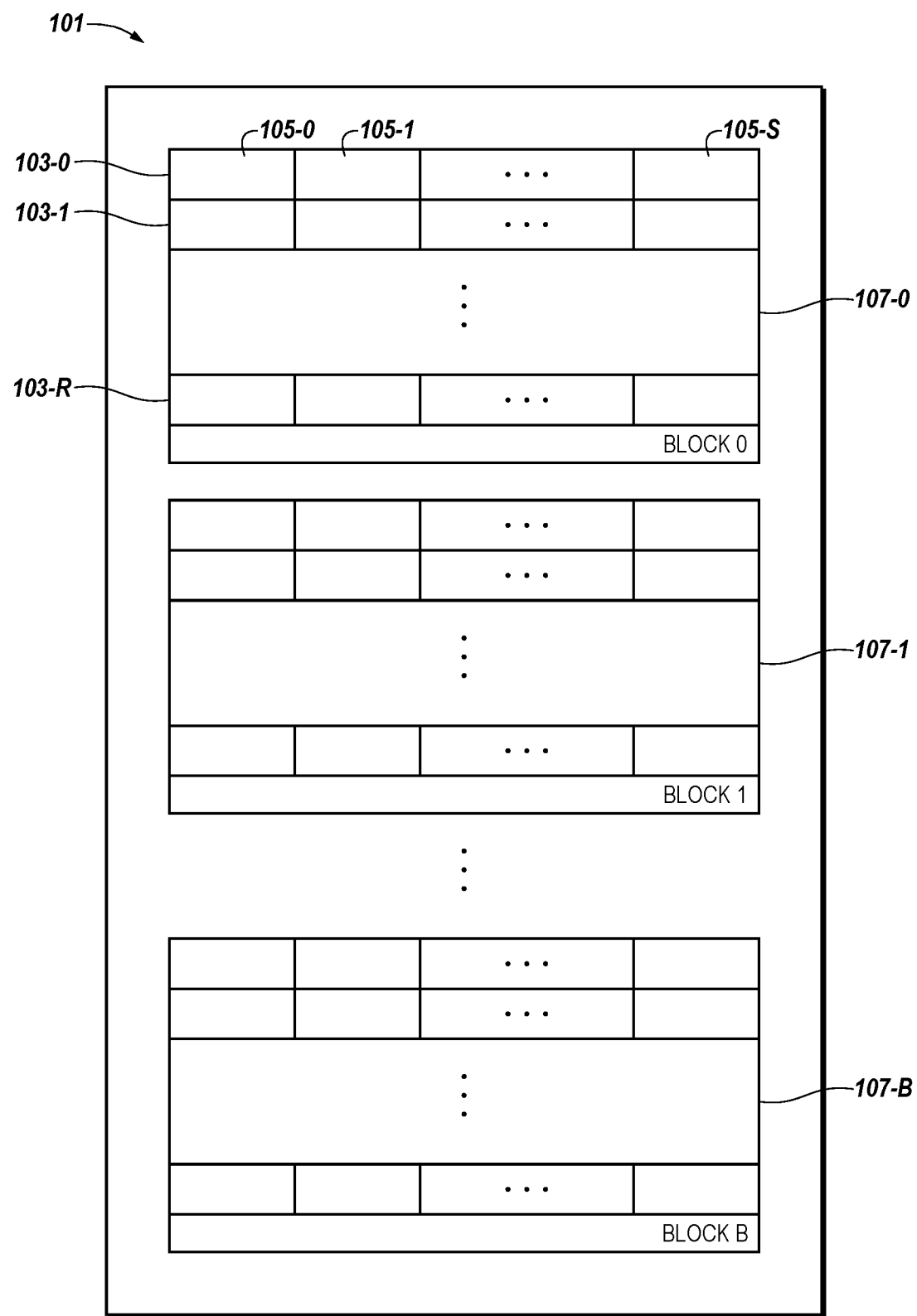
FIG. 1 illustrates a diagram of a portion of a memory array having a number of physical blocks in accordance with an embodiment of the present disclosure.

The present disclosure includes apparatuses, methods, and systems for block chain based validation of memory commands. An embodiment includes a memory, and circuitry configured to receive a command that is included in a block in a block chain for validating commands to be executed on the memory, wherein the command includes an anti-replay portion that is based on a previous command included in a previous block in the block chain, validate the command using the anti-replay portion of the command, and execute the command on the memory upon validating the command.

Many threats can affect the operation of memory (e.g. a memory device) and/or the data stored therein (e.g., the data stored in the memory cells of the memory device). For example, a hacker or other malicious user may attempt to perform activities (e.g., attacks), such as, for instance, a man-in-the-middle (MITM) attack, to make unauthorized changes to the operation of the memory, and/or to the data stored therein, for malicious purposes. One example of an MITM attack is a replay attack, in which a valid command (e.g., a command that has been validly issued to a memory device) is caused to be fraudulently repeated (e.g., reissued) and/or fraudulently re-executed (e.g., reused) by the memory device multiple (e.g., many) times. Such hacking activities can cause significant financial loss, and/or can present significant safety and/or security issues.

As such, in order to ensure a secure memory, it is important for the memory to utilize an anti-replay (e.g., freshness) mechanism to validate that a command received by the memory has not been previously (e.g., already) executed, in order to prevent commands from being fraudulently repeated and/or fraudulently re-executed as part of an MITM replay attack. Previous anti-replay mechanisms can include, for instance, timestamps, random number generators, and/or counters (e.g., monotonic counters), that can provide a piece of information that changes at the issuance of each new command in order to validate that command. However, such previous anti-replay mechanisms may require information (e.g., data) to be stored in the memory (e.g., in the memory cells of the memory device), which can reduce the amount of space available in the memory for data storage. Further, such previous anti-replay mechanisms may require additional components and/or circuitry dedicated specifically to the anti-replay functionality, which can increase the size and/or complexity of the circuitry of the memory.

In contrast, embodiments of the present disclosure can utilize block chain based validation of memory commands to provide an anti-replay (e.g., freshness) mechanism that can effectively prevent attacks such as an MITM replay attack, and thereby ensure a secure memory. Such an anti-replay mechanism may not require information to be stored in the memory, which can increase the amount of space available in the memory for data storage as compared to memory utilizing previous anti-replay mechanisms. Further, such an anti-replay mechanism may not require additional circuitry dedicated specifically to the anti-replay functionality, which can reduce the size and/or complexity of the circuitry of the memory as compared to memory utilizing previous anti-replay mechanisms. For instance, such an anti-replay mechanism may utilize the existing circuitry of the memory (e.g., the existing firmware of the memory device) to provide the anti-replay functionality, without having to add additional (e.g., new) components or circuitry dedicated specifically to the anti-replay functionality.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 (e.g., a subset of array 101, or the whole array 201) can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . , 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . , 107-B) can be included in a plane of memory cells, and a number of planes of memory cells can be included on a die. For instance, in the example shown in FIG. 1, each physical block 107-0, 107-1, . . . , 107-B can be part of a single die. That is, the portion of memory array 101 illustrated in FIG. 1 can be a die of memory cells.

As shown in FIG. 1, each physical block 107-0, 107-1, . . . , 107-B includes a number of physical rows (e.g., 103-0, 103-1, . . . , 103-R) of memory cells coupled to access lines (e.g., word lines). The number of rows (e.g., word lines) in each physical block can be 32, but embodiments are not limited to a particular number of rows 103-0, 103-1, . . . , 103-R per physical block. Further, although not shown in FIG. 1, the memory cells can be coupled to columns of sense lines (e.g., data lines and/or digit lines).

As one of ordinary skill in the art will appreciate, each row 103-0, 103-1, . . . , 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . , 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . , 105-S (e.g., subsets of memory cells). Each physical sector 105-0, 105-1, . . . , 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . , 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . , 107-B, rows 103-0, 103-1, . . . , 103-R, sectors 105-0, 105-1, . . . , 105-S, and pages are possible. For example, rows 103-0, 103-1, . . . , 103-R of physical blocks 107-0, 107-1, . . . , 107-B can each store data corresponding to a single logical sector which can include, for example, more or less than 512 bytes of data.

Figure 2:
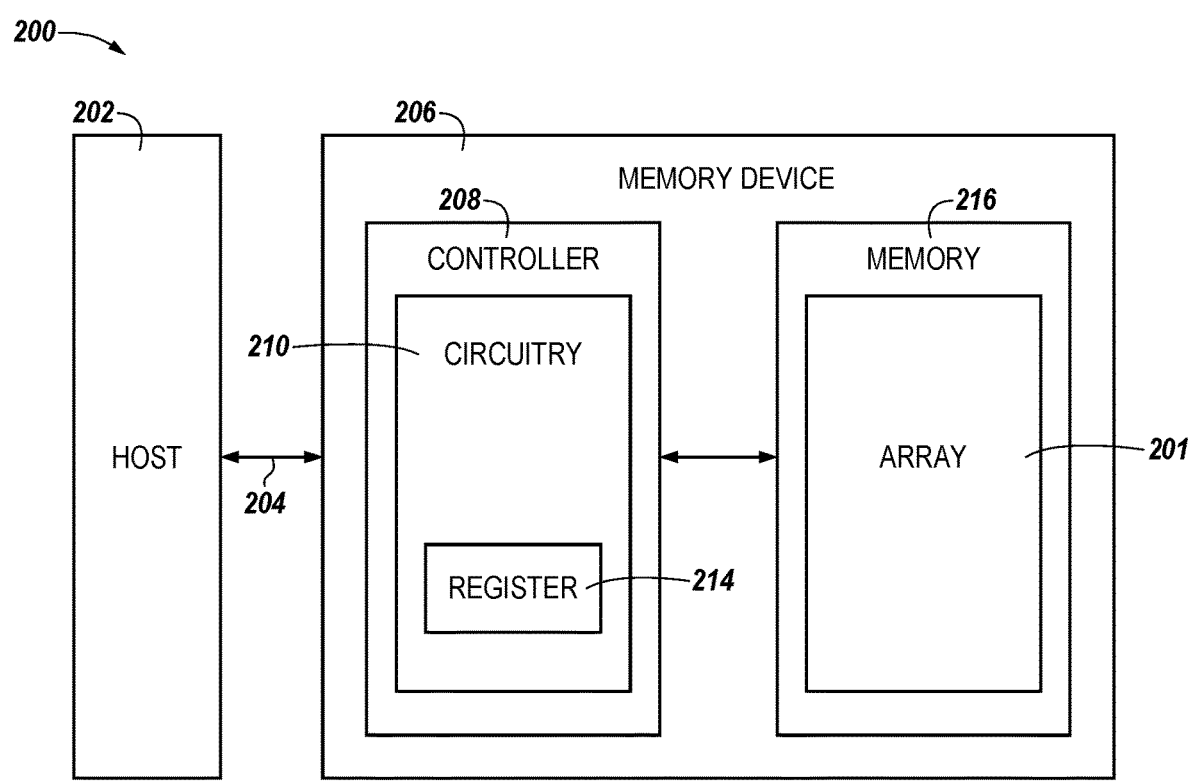
FIG. 2 is a block diagram of a computing system including a host and an apparatus in the form of a memory device in accordance with an embodiment of the present disclosure.

FIG. 2 is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206.

In the embodiment illustrated in FIG. 2, memory device 206 can include a memory 216 having a memory array 201. Memory array 201 can be analogous to memory array 101 previously described in connection with FIG. 1. Further, in an embodiment, memory array 201 (e.g., a subset of array 201, or the whole array 201) can be a secure array (e.g., an area of memory 216 to be kept under control). For example, the data stored in memory array 201 can include sensitive (e.g., non-user) data, such as host firmware and/or code to be executed for sensitive applications. Although one memory array 201 is illustrated in FIG. 2, memory 216 can include any number of memory arrays analogous to memory array 201.

As illustrated in FIG. 2, host 202 can be coupled to the memory device 206 via interface 204. Host 202 and memory device 206 can communicate (e.g., send commands and/or data) on interface 204. Host 202 and/or memory device 206 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 216 (e.g., memory array 201). For instance, controller 208 can send commands to perform operations on memory array 201, including operations to sense (e.g., read), program (e.g., write), move, and/or erase data, among other operations.

Controller 208 can be included on the same physical device (e.g., the same die) as memory 216. Alternatively, controller 208 can be included on a separate physical device that is communicatively coupled to the physical device that includes memory 216. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data, among other operations. Further, in an embodiment, host 202 can be an IoT enabled device, as previously described herein, having IoT communication capabilities.

Controller 208 on memory device 206 and/or the host controller on host 202 can include control circuitry and/or logic (e.g., hardware and firmware). In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and a number of registers.

For example, as shown in FIG. 2, memory device can include circuitry 210. In the embodiment illustrated in FIG. 2, circuitry 210 is included in controller 208. However, embodiments of the present disclosure are not so limited. For instance, in an embodiment, circuitry 210 may be included in (e.g., on the same die as) memory 216 (e.g., instead of in controller 208). Circuitry 210 can comprise, for instance, hardware, firmware, and/or software.

Computing system 200 (e.g., host 202 and memory device 206) can utilize block chain based validation of memory commands to provide an anti-replay (e.g., freshness) mechanism that can effectively prevent an attach such as an MITM replay attack, and thereby ensure the security of computing system 200. For example, host 202 can generate an anti-replay portion for (e.g., to be included with) a command to be executed on memory 216 (e.g., on memory array 201). The command can be included in a block in a block chain for validating commands to be executed on memory 216, and the anti-replay portion for the command can be based on (e.g., generated from) a previous command included in the previous block in the block chain. For instance, host 202 can generate the next block in the block chain, include the command in this block, and generate the anti-replay portion for the command based on the anti-replay portion of the previously executed command included in the previous block in the block chain. An example illustrating such a command will be further described herein (e.g., in connection with FIG. 3).

As such, the anti-replay portion, which may also be referred to herein as a freshness field, that is generated by host 202 can change with the issuance of each new command by host 202. Accordingly, the anti-replay portion can be used to validate that a command has not been previously executed, as will be further described herein.

As used herein, a "block in a block chain" can include data (e.g., payload), headers, timestamps, history, etc. However, as used herein a block in a block chain does not have to equate to the size of a block of memory as described previously in connection with FIG. 1. For instance, a block in a block chain may be smaller, equivalent, and/or larger than a block size denomination of a particular memory associated with an architecture or designation.

The anti-replay portion generated for the command can be, for example, a cryptographic hash of (e.g. a link to) the anti-replay portion of the previous command included in the previous block in the block chain. The cryptographic hash can comprise, for instance, a SHA-256 cryptographic hash.

As an additional example, the anti-replay portion generated for the command can be a signature generated (e.g., calculated) for the anti-replay portion of the previous command included in the previous block in the block chain. The signature can be, for instance, a digital signature generated using asymmetric cryptography (e.g., based on a public and/or private key), and can comprise, for instance, an elliptical curve digital signature. As an additional example, the signature can be generated using symmetric cryptography (e.g., based on a unique secret key shared between host 202 and memory device 206). In such an approach, the signature can be calculated using a message authentication code (MAC) function.

In some embodiments, the command can include a signature (e.g., digital signature) associated with host 202, which can be generated by host 202 using symmetric or asymmetric cryptography. The signature associated with host 202 can indicate that the command was issued by host 202 (e.g., confirm the identity of the host), and accordingly can be used during the validation of the command, as will be further described herein.

For the command (e.g., the initial command) included in the initial (e.g., first) block in the block chain, host 202 can generate the anti-replay portion from a random value (e.g., random number) generated by host 202 (e.g., because there would not yet be a previous block in the block chain from which the anti-replay portion could be generated). For example, the anti-replay portion generated for the initial command can be a cryptographic hash of the random value. The random value can be generated by host 202, for instance, using a physical unclonable function (PUF) or other random number generation method. The anti-replay portion for the initial command may be generated (e.g., the freshness field may be initialized) responsive to a powering (e.g., a powering on and/or powering up) of memory device 206.

In some embodiments, the command and the previous command can be included in (e.g., part of) a sequence of commands issued by host 202 for execution on memory 206 (e.g., the command is the next command in the sequence after the previous command). In such embodiments, the block in the block chain in which the command is included can include an indication of the position (e.g., order) of the command in the sequence of commands. This position indication can be used to confirm the commands of the sequence are being executed in their proper order, and accordingly can be used during the validation of the command, as will be further described herein.

Host 202 can send, via interface 204, the command having the anti-replay portion to memory device 206 (e.g., to circuitry 210). Upon receiving the command, memory device 206 (e.g., circuitry 210) can validate (e.g., determine whether to validate) the command using the anti-replay portion of the received command. As used herein, validating the command can include and/or refer to ensuring that the command has not been previously executed on memory 216 (e.g., to ensure that the command is not being fraudulently repeated and/or re-used as part of an attach such as MITM replay attack).

For example, as shown in FIG. 2, circuitry 210 can include a volatile register 214 that can include (e.g., store) the anti-replay portion (e.g., freshness field) of the previous command included in the previous block in the block chain, which was previously received by circuitry 210 when that previous command was sent to memory device 206 by host 202. Circuitry 210 can use the anti-replay portion of the previous command stored in register 214, in combination with the anti-replay portion of the current command (e.g., the currently received command) from host 202, to validate the current command.

For example, circuitry 210 can compare the anti-replay portion of the current command to an expected value for the anti-replay portion of the current command (e.g., to the value that the anti-replay portion would be expected to be). This expected value can be generated (e.g., calculated) by circuitry 210 using the anti-replay portion of the previous command stored in register 214, in a manner that matches the manner in which the anti-replay portion of the current command was generated by host 202. For instance, if the anti-replay portion of the current command that was generated by host 202 is a cryptographic hash of the anti-replay portion of the previous command, the expected value generated by circuitry 210 can be a cryptographic hash (e.g., a SHA-256 cryptographic hash) of the anti-replay portion stored in register 214; if the anti-replay portion of the current command that was generated by host 202 is a digital signature for the anti-replay portion of the previous command generated using asymmetric cryptography, the expected value generated by circuitry 210 can be a digital signature (e.g., an elliptical curve digital signature generated using asymmetric cryptography) for the anti-replay portion stored in register 214. Upon the comparison indicating the anti-replay portion of the current command matches the expected value generated using the anti-replay portion stored in register 214, the current command can be validated. If, however, the comparison indicates that the anti-replay portion of the current command does not match the expected value, the current command may not be validated (e.g., because this may indicate that an attack such as an MITM replay attack is occurring).

As an additional example, if the anti-replay portion of the current command that was generated by host 202 is a signature for the anti-replay portion of the previous command generated using symmetric cryptography, the expected value can be calculated by circuitry 210 using its own copy of the secret key. Upon the comparison indicating the anti-replay portion of the current command matches the expected value calculated using the secret key, the current command can be validated. If, however, the comparison indicates the anti-replay portion of the current command does not match the expected value generated using the secret key, the current command may not be validated.

In embodiments in which the received command includes a signature (e.g., digital signature) associated with host 202, circuitry 210 can also use the signature (e.g., in addition to using the anti-replay portion) to validate the command. For instance, circuitry 210 can verify the signature using a public and/or private key, and validate the command upon verifying the signature. If, however, circuitry 210 is unable to verify the signature, the command may not be validated. An example of a verification of a signature will be further described herein (e.g., in connection with FIG. 8).

In embodiments in which the command is part of a sequence of commands, and the block in the block chain in which the command is included includes an indication of the position of the command in the command sequence, circuitry 210 can also use this position indication (e.g., in addition to using the anti-replay portion) to validate the command. For instance, circuitry 210 can use the position indication of the current command to verify that the current command is the next command in the sequence (e.g., is the command after the previous command in the sequence), and validate the current command upon verifying the current command is the next command in the sequence. If, however, circuitry 210 is unable to verify the current command is the next command in the sequence, the command may not be validated (e.g., because it is out of order in the sequence).

Upon validating the command received from host 202, circuitry 210 can execute the command on memory 216 (e.g., on memory array 201). For instance, if the command is a program (e.g., write) command, circuitry 210 can program the data associated with the command to memory 216; if the command is a sense (e.g., read) command, circuitry 210 can sense the data associated with the command from memory 216.

Upon executing the command received from host 202, circuitry 210 can generate a command response (e.g., a response to the execution of the command), and send the command response to host 202 via interface 204. The command response can include the result of the execution of the command. For instance, if the command is a program command, the result of the command can include an indication of whether the data associated with the command was successfully programmed and/or the location to which the data was programmed in memory 216; if the command is a sense command, the result of the command can include the data sensed as a result of the execution of the sense command.

The command response can also include an anti-replay portion (e.g., freshness field). The anti-replay portion of the command response can be the anti-replay portion of the command received from host 202 (e.g., the anti-replay portion of the command received from host 202 can also be used as the anti-replay portion of the command response). This anti-replay portion can also be stored in register 214 (e.g., replacing the anti-replay portion of the previous command).

In some embodiments, the command response can include a signature (e.g., digital signature) associated with memory device 206, which can be generated by memory device 206 (e.g., circuitry 210) using asymmetric or symmetric cryptography, for instance. The signature associated with memory device 206 can indicate that the command response was generated and sent by memory device 206 (e.g., confirm the identity of the memory device).

Upon receiving the command response, host 202 can validate (e.g., determine whether to validate) the result of the execution of the command using the anti-replay portion of the command response. For example, host 202 can compare the anti-replay portion of the command response to the signature generated (e.g., calculated) by host 202. Upon the comparison of the signature indicating the anti-replay portion of the command response matches the signature generated by host 202, the result of the execution of the command can be validated. If, however, the comparison indicates that the anti-replay portion of the command response does not match the signature, the result of the execution of the command may not be validated (e.g., because this may indicate that an attack such as an MITM replay attack is occurring).

In embodiments in which the command response includes a signature associated with memory device 206, host 202 can also use the signature (e.g., in addition to using the anti-replay portion) to validate the result of the execution of the command. For instance, host 202 can verify the signature using a public and/or private key, and validate the result of the execution of the command upon verifying the signature. If, however, host 202 is unable to verify the signature, the result of the execution of the command may not be validated. An example of a verification of a signature will be further described herein (e.g., in connection with FIG. 8).

After the validation of the result of the execution of the command, host 202 can generate an anti-replay portion for an additional (e.g., subsequent) command to be executed on memory 216, in a manner analogous to which the anti-replay portion for the executed command was generated. For example, this additional command can be included in the subsequent (e.g. next) block in the block chain for validating commands to be executed on memory 216, and the anti-replay portion for this additional command can be based on the executed command (e.g., on the anti-replay portion of the executed command), which has now become the previous command in the previous block in the block chain. This additional command may also include a signature (e.g., digital signature) associated with host 202, and/or may be part of (e.g., the next command in) a sequence of commands issued by host 202, in a manner analogous to the now previously executed command.

Upon receiving the additional command from host 202, memory device 206 can validate the additional command using the anti-replay portion of the additional command, and execute the additional command upon validating the additional command, in a manner analogous to that previously described herein for the now previously executed command. For example, memory device 206 can use the anti-replay portion of what has now become the previous command that is now stored in register 214, in combination with the anti-replay portion of the additional command, to validate the additional command, in a manner analogous to that previously described herein for the now previously executed command.

Upon executing the additional command, memory device 206 can generate a command response for the additional command, and send the command response to host 202, in a manner analogous to that previously described herein for the previously executed command. The command response for the additional command can include an anti-replay portion used by host 202 to validate the command response upon receipt of the command response, in a manner analogous to that previously described for the command response for the previously executed command. Additional anti-replay portions for additional commands can continue to be generated by host 202 and used by memory device 206 to validate those commands in such a manner throughout the lifetime of memory device 206.

The embodiment illustrated in FIG. 2 can include additional circuitry, logic, and/or components not illustrated so as not to obscure embodiments of the present disclosure. For example, memory device 206 can include address circuitry to latch address signals provided over I/O connectors through I/O circuitry. Address signals can be received and decoded by a row decoder and a column decoder, to access memory array 201. Further, memory device 206 can include a main memory, such as, for instance, a DRAM or SDRAM, that is separate from and/or in addition to memory array 201. An example further illustrating additional circuitry, logic, and/or components of memory device 206 will be further described herein (e.g., in connection with FIG. 9).

FIG. 3 illustrates an example of commands (e.g., commands 320-1 and 320-2) that can be validated utilizing block chain based validation in accordance with an embodiment of the present disclosure. Commands 320-1 and 320-2 can be commands issued by host 202 for execution on memory 216, as previously described in connection with FIG. 2. For example, command 320-2 can be a command currently being issued by host 202 for execution on memory 216, and command 320-1 can be a previous command that has been previously executed on memory 216. Further, commands 320-1 and 320-2 can be included in a block in a block chain for validating commands to be executed on memory 216, as previously described in connection with FIG. 2. For example, command 320-1 can be included in the block in the block chain that is before the block in the block chain that includes command 320-2 (e.g., the block that includes command 320-2 can be the next block in the chain after the block that includes command 320-1).

As shown in FIG. 3, each respective command 320-1 and 320-2 can include operating code and parameters for that command. For instance, command 320-1 includes operating code 322-1 and parameters 324-1, and command 320-2 includes operating code 322-2 and parameters 324-2.

The operating code and parameters for a command can include (e.g., provide) information used by memory device 206 to execute the command on memory 216. For instance, the operating code and parameters for a command can indicate the type of command (e.g., program, sense, move, or erase) to be executed on memory 216, and/or the location in memory 216 on which the command is to be executed (e.g., the location in memory 216 to which the data associated with the command is to be programmed, erased, moved, or sensed from).

As shown in FIG. 3, each respective command 320-1 and 320-2 can include an anti-replay portion (e.g., freshness field). For instance, command 320-1 includes anti-replay portion 326-1, and command 320-2 includes anti-replay portion 326-2.

The anti-replay portion for a command can be based on (e.g., generated from) the previous command included in the previous block of the block chain, as previously described in connection with FIG. 2. For example, as shown in FIG. 3, anti-replay portion 326-2 of command 320-2 can be generated from anti-replay portion 326-1 of command 320-1. For instance, anti-replay portion 326-2 can be cryptographic hash of anti-replay portion 326-1, or a signature for anti-replay portion 326-1, as previously described in connection with FIG. 2.

The anti-replay portion for a command can be used to validate that the command has not been previously executed, as previously described in connection with FIG. 2. For instance, anti-replay portion 326-2 can be used to validate that command 320-2 has not been previously executed on memory 216.

As shown in FIG. 3, each respective command 320-1 and 320-2 can include a signature. For instance, command 320-1 includes signature 328-1, and command 320-2 includes signature 328-2. The signature of a command can indicate that the command was issued by host 202, and can be used during the validation of the command, as previously described in connection with FIG. 2.

FIG. 4 is a block diagram of an example system including a host 402 and a memory device 406 in accordance with an embodiment of the present disclosure. Host 402 and memory device 406 can be, for example, host 202 and memory device 206, respectively, previously described in connection with FIG. 2.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 4, Layer 0 ("$L_0$") 451 and Layer 1 ("$L_1$") 453 are within the host. Layer 0 451 can provide a Firmware Derivative Secret (FDS) key 452 to Layer 1 453. The FDS key 452 can describe the identity of code of Layer 1 453 and other security relevant data. In an example, a particular protocol (such as robust internet of things (RIOT) core protocol) can use the FDS 452 to validate code of Layer 1 453 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 458 can be used to create the FDS 452 and be stored in memory of the host 402.

The host can transmit data, as illustrated by arrow 454, to the memory device 406. The transmitted data can include an external identification that is public, a certificate (e.g., an external identification certificate), and/or an external public key. Layer 2 ("$L_2$") 455 of the memory device 406 can receive the transmitted data, and execute the data in operations of the operating system ("OS") 457 and on a first application 459-1 and a second application 459-2.

In an example operation, the host 402 can read the device secret 458, hash an identity of Layer 1 453, and perform a calculation including:

$$K_{L1} = KDF[Fs(s), \text{Hash (``immutable information'')}]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 458. FDS 452 can be determined by performing:

$$FDS = HMAC\text{-}SHA256[Fs(s), SHA256(\text{``immutable information''})]$$

Likewise, the memory device 406 can transmit data, as illustrated by arrow 456, to the host 402.

Figure 5:
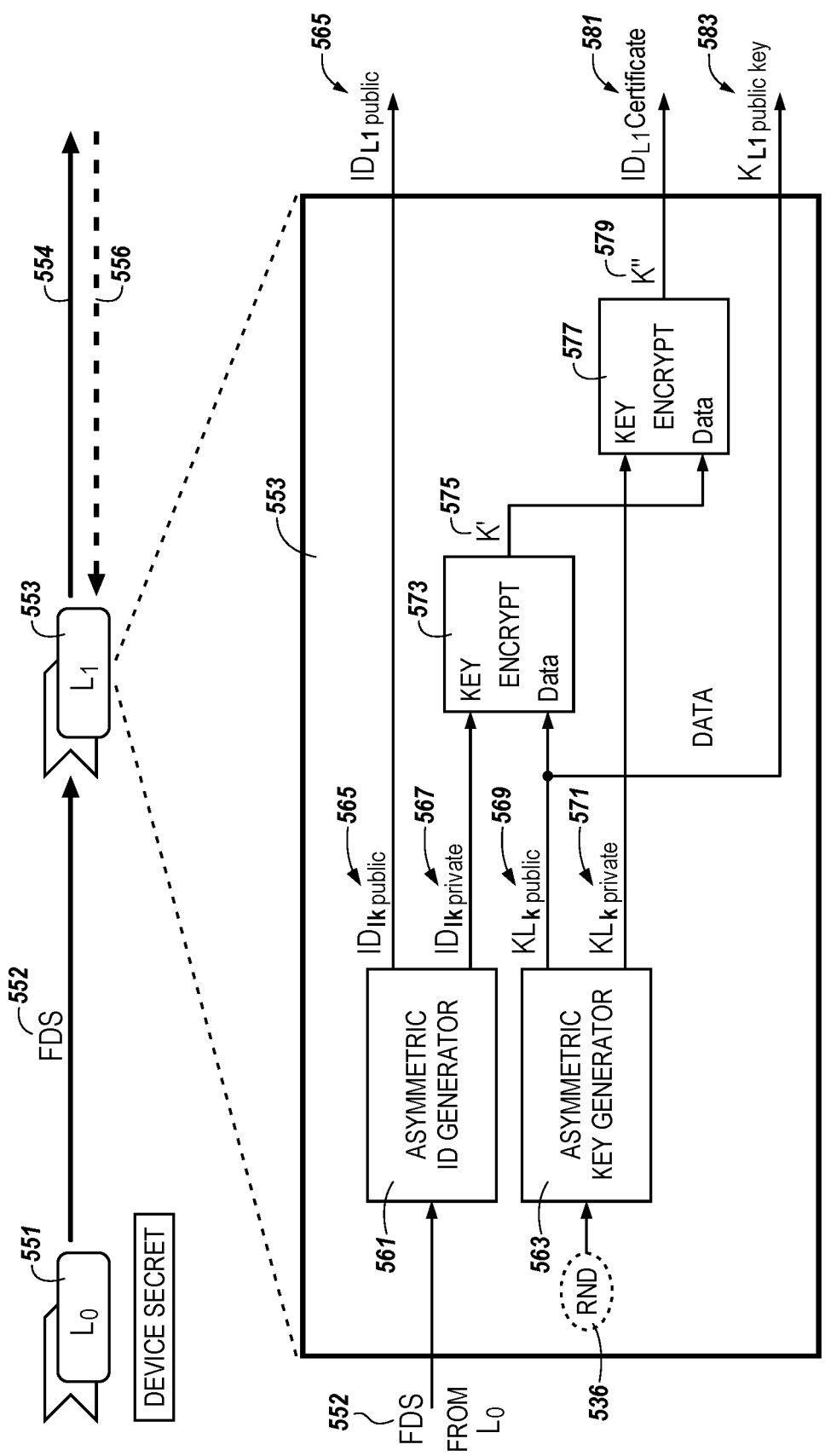
FIG. 5 is a block diagram of an example process to determine a number of parameters in accordance with an embodiment of the present disclosure.

FIG. 5 is a block diagram of an example process to determine a number of parameters in accordance with an embodiment of the present disclosure. FIG. 5 is an example of a determination of the parameters including the external public identification, the external certificate, and the external public key that are then sent, indicated by arrow 554, to Layer 2 (e.g., Layer 2 455) of a memory device (e.g., 406 in FIG. 4). Layer 0 ("$L_0$") 551 in FIG. 5 corresponds to Layer 0 451 in FIG. 4 and likewise FDS 552 corresponds to FDS 452, Layer 1 553 corresponds to Layer 1 453, and arrows 554 and 556 correspond to arrows 454 and 456, respectively.

The FDS 552 from Layer 0 551 is sent to Layer 1 553 and used by an asymmetric ID generator 561 to generate a public identification ("$ID_{lk\ public}$") 565 and a private identification 567. In the abbreviated "$ID_{lk\ public}$," the "lk" indicates Layer k (in this example Layer 1), and the "public" indicates that the identification is openly shared. The public identification 565 is illustrated as shared by the arrow extending to the right and outside of Layer 1 553 of the host. The generated private identification 567 is used as a key input into an encryptor 573. The encryptor 573 can be any processor, computing device, etc. used to encrypt data.

Layer 1 553 of a host can include an asymmetric key generator 563. In at least one example, a random number generator (RND) 536 can optionally input a random number into the asymmetric key generator 563. The asymmetric key generator 563 can generate a public key ("$K_{Lk\ public}$") 569 (referred to as an external public key) and a private key ("$K_{LK\ private}$") 571 (referred to as an external private key) associated with a host such as host 402 in FIG. 4. The external public key 569 can be an input (as "data") into the encryptor 573. The encryptor 573 can generate a result K' 575 using the inputs of the external private identification 567 and the external public key 569. The external private key 571 and the result K' 575 can be input into an additional encryptor 577, resulting in output K" 579. The output K" 579 is the external certificate ("$ID_{L1}$ certificate") 581 transmitted to the Layer 2 (455 of FIG. 4). The external certificate 581 can provide an ability to verify and/or authenticate an origin of data sent from a device. As an example, data sent from the host can be associated with an identity of the host by verifying the certificate, as will be described further in association with FIG. 7. Further, the external public key ("$K_{L1\ public\ key}$") 583 can be transmitted to Layer 2. Therefore, the public identification 565, the certificate 581, and the external public key 583 of a host can be transmitted to Layer 2 of a memory device.

Figure 6:
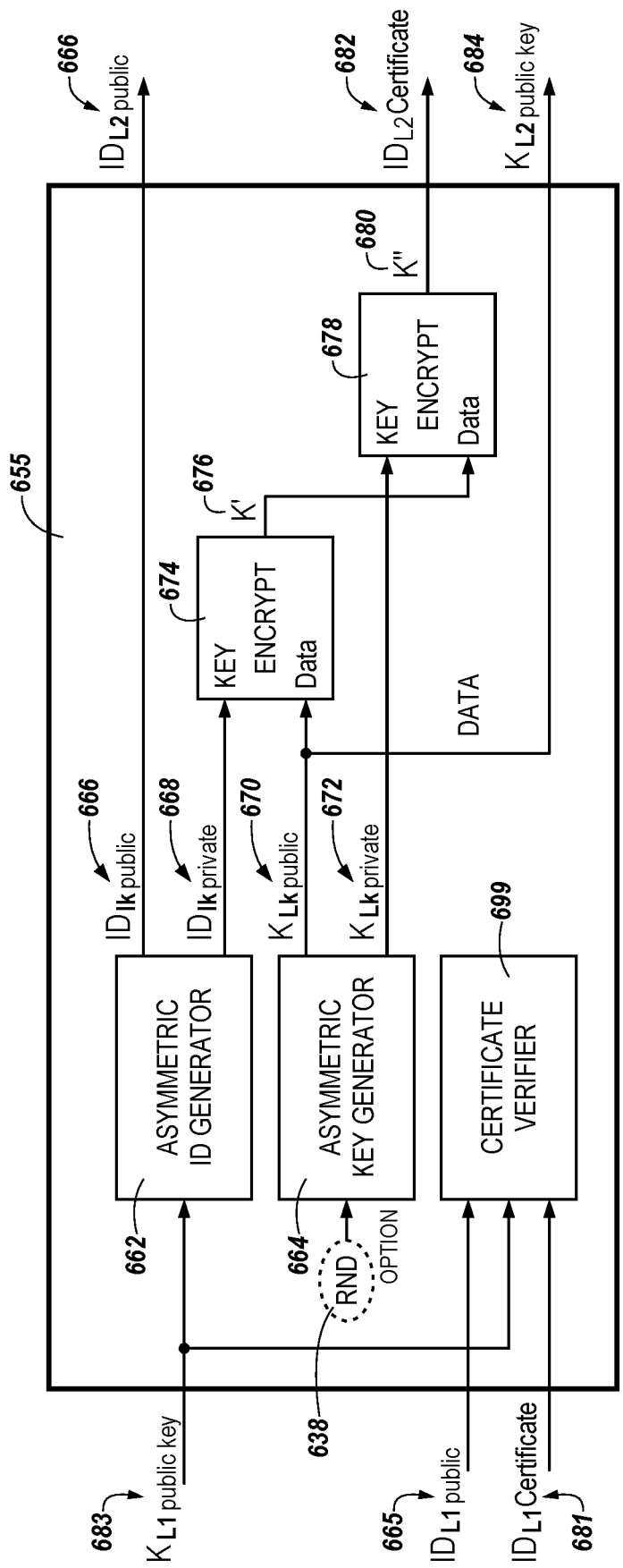
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 illustrates a Layer 2 655 of a memory device (e.g., memory device 406 in FIG. 4) generating a device identification ("$ID_{L2}$ public") 666, a device certificate ("$ID_{L2}$ Certificate") 682, and a device public key ("$K_{L2\ public\ key}$") 684.

The external public key ("$K_{L1\ public\ key}$") 683 transmitted from Layer 1 of the host to Layer 2 655 of a memory device, as described in FIG. 5, is used by an asymmetric ID generator 662 of the memory device to generate a public identification ("$ID_{lk\ public}$") 666 and a private identification 668 of the memory device. In the abbreviated "$ID_{lk\ public}$," the "lk" indicates Layer k (in this example Layer 2), and the "public" indicates that the identification is openly shared. The public identification 666 is illustrated as shared by the arrow extending to the right and outside Layer 2 655. The generated private identification 668 is used as a key input into an encryptor 674.

As shown in FIG. 6, the external certificate 681 and public identification 665, along with the external public key 683, are used by a certificate verifier 699. The certificate verifier 699 can verify the external certificate 681 received from a host, and determine, in response to the external certificate 681 being verified or not being verified, whether to accept or discard data received from the host. Further details of verifying the external certificate 681 are further described herein (e.g., in connection with FIG. 7).

Layer 2 655 of the memory device can include an asymmetric key generator 664. In at least one example, a random number generator (RND) 638 can optionally input a random number into the asymmetric key generator 664. The asymmetric key generator 664 can generate a public key ("$K_{Lk\ public}$") 670 (referred to as a device public key) and a private key ("$K_{LK\ private}$") 672 (referred to as a device private key) associated with a memory device such as memory device 406 in FIG. 4. The device public key 670 can be an input (as "data") into the encryptor 674. The encryptor 674 can generate a result K' 676 using the inputs of the device private identification 668 and the device public key 670. The device private key 672 and the result K' 676 can be input into an additional encryptor 678, resulting in output K" 680. The output K" 680 is the device certificate ("$ID_{L2}$ certificate") 682 transmitted back to the Layer 1 (453 of FIG. 4). The device certificate 682 can provide an ability to verify and/or authenticate an origin of data sent from a device. As an example, data sent from the memory device can be associated with an identity of the memory device by verifying the certificate, as will be described further in association with FIG. 7. Further, the device public key ("$K_{L2\ public\ key}$") 684 can be transmitted to Layer 1. Therefore, the public identification 666, the certificate 682, and the device public key 684 of the memory device can be transmitted to Layer 1 of a host.

In an example, in response to a host receiving a public key from a memory device, the host can encrypt data to be sent to the memory device using the device public key. Vice versa, the memory device can encrypt data to be sent to the host using the external public key. In response to the memory device receiving data encrypted using the device public key, the memory device can decrypt the data using its own device private key. Likewise, in response to the host receiving data encrypted using the external public key, the host can decrypt the data using its own external private key. As the device private key is not shared with another device outside the memory device and the external private key is not shared with another device outside the host, the data sent to the memory device and the host remains secure.

Figure 7:
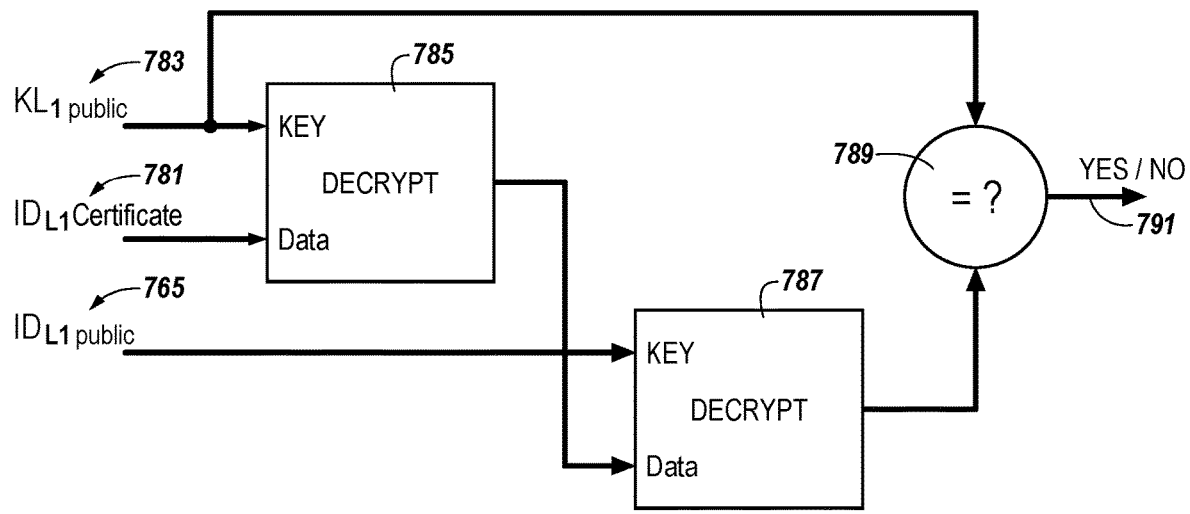
FIG. 7 is a block diagram of an example process to verify a certificate in accordance with an embodiment of the present disclosure.

FIG. 7 is a block diagram of an example process to verify a certificate in accordance with an embodiment of the present disclosure. In the illustrated example of FIG. 7, a public key 783, a certificate 781, and a public identification 765 is provided from a host (e.g., from Layer 1 453 of host 402 in FIG. 4). The data of the certificate 781 and the external public key 783 can be used as inputs into a decryptor 785. The decryptor 785 can be any processor, computing device, etc used to decrypt data. The result of the decryption of the certificate 781 and the external public key 783 can be used as an input into a secondary decryptor 787 along with the public identification, result in an output. The external public key 783 and the output from the decryptor 787 can indicate, as illustrated at 789, whether the certificate is verified, resulting in a yes or no 791 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 8:
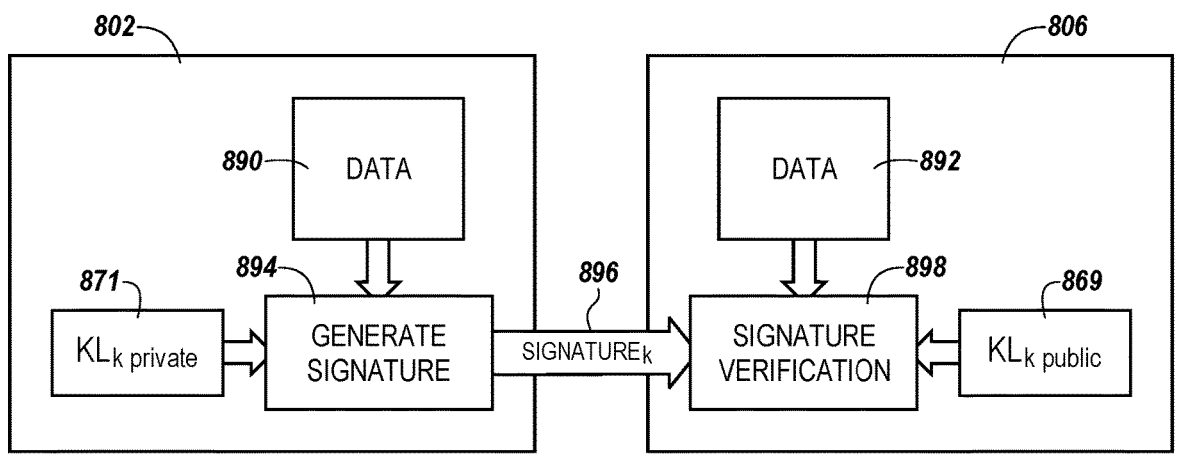
FIG. 8 is a block diagram of an example process to verify a signature in accordance with an embodiment of the present disclosure.

FIG. 8 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A host 802 (such as host 202 in FIG. 2) can send data 890 to a memory device 806 (such as memory device 206 in FIG. 2). The host 802 can generate, at 894, a signature 896 using a device private key 871. The signature 896 can be transmitted to the memory device 806. The memory device 806 can verify, at 898, the signature using data 892 and the external public key 869 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 9:
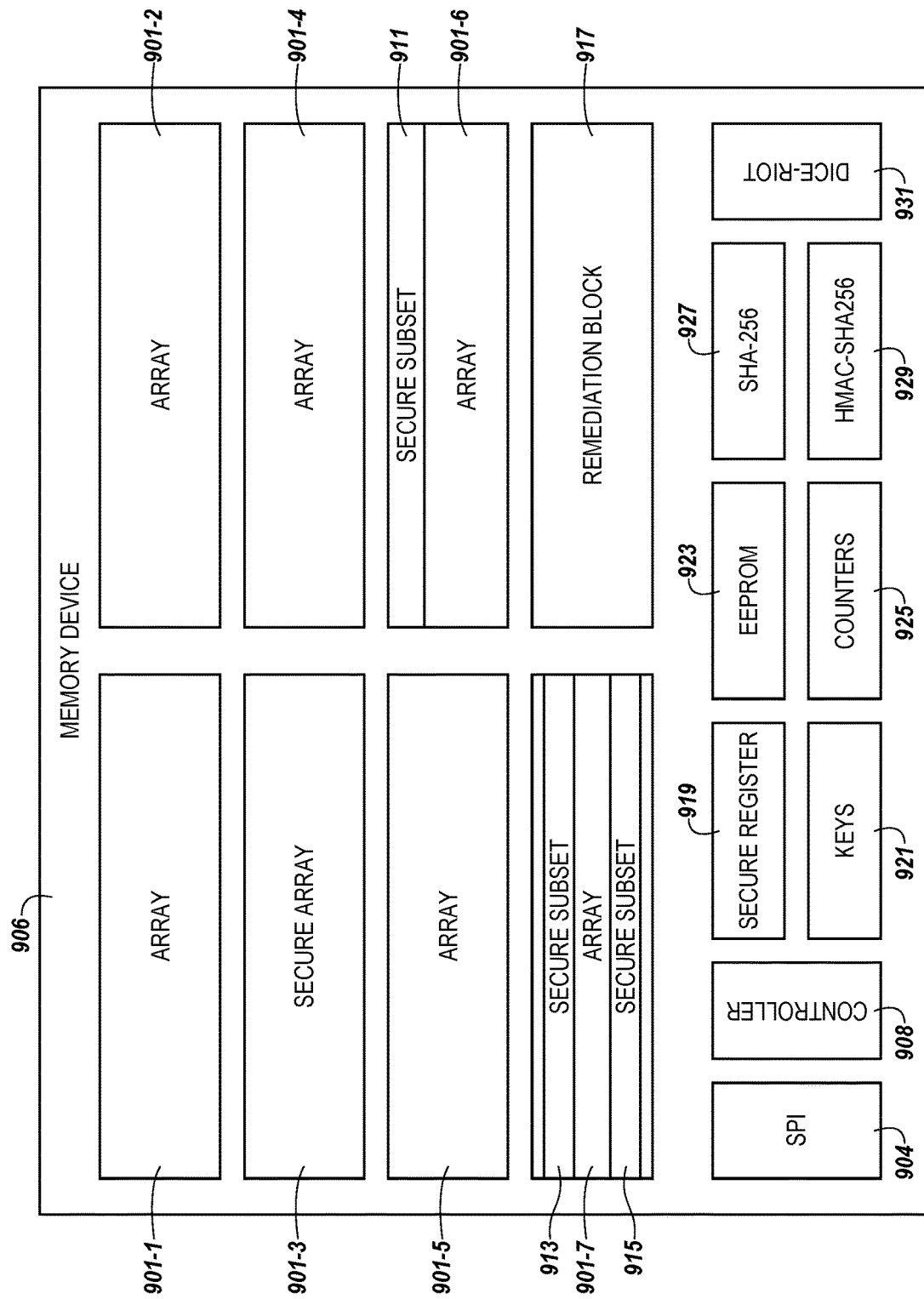
FIG. 9 is a block diagram of an example memory device in accordance with an embodiment of the present disclosure.

FIG. 9 is a block diagram of an example memory device 906 in accordance with an embodiment of the present disclosure. Memory device 906 can be, for example, memory device 206 previously described in connection with FIG. 2.

As shown in FIG. 9, memory device 906 can include a number of memory arrays 901-1 through 901-7. Memory arrays 901-1 through 901-7 can be analogous to memory array 101 previously described in connection with FIG. 1. Further, in the example illustrated in FIG. 9, memory array 901-3 is a secure array, subset 911 of memory array 901-6 comprises a secure array, and subsets 913 and 915 of memory array 901-7 comprise a secure array. Subsets 911, 913, and 915 can each include, for instance, 4 kilobytes of data. However, embodiments of the present disclosure are not limited to a particular number or arrangement of memory arrays or secure arrays.

As shown in FIG. 9, memory device 906 can include a remediation (e.g., recovery) block 917. Remediation block 917 can be used as a source of data in case of errors (e.g., mismatches) that may occur during operation of memory device 906. Remediation block 917 may be outside of the area of memory device 906 that is addressable by a host.

As shown in FIG. 9, memory device 906 can include a serial peripheral interface (SPI) 904 and a controller 908. Memory device 906 can use SPI 904 and controller 908 to communicate with a host and memory arrays 901-1 through 901-7, as previously described herein (e.g., in connection with FIG. 2).

As shown in FIG. 9, memory device 906 can include a secure register 919 for managing the security of memory device 906. For example, secure register 919 can configure, and communicate externally, to an application controller. Further, secure register 919 may be modifiable by an authentication command.

As shown in FIG. 9, memory device 906 can include keys 921. For instance, memory device 906 can include eight different slots to store keys such as root keys, DICE-RIOT keys, and/or other external session keys.

As shown in FIG. 9, memory device 906 can include an electronically erasable programmable read-only memory (EEPROM) 923. EEPROM 923 can provide a secure non-volatile area available for a host, in which individual bytes of data can be erased and programmed.

As shown in FIG. 9, memory device 906 can include counters (e.g., monotonic counters) 925. For instance, memory device 906 can include six different monotonic counters, two of which may be used by memory device 906 for authenticated commands, and four of which may be used by the host.

As shown in FIG. 9, memory device 906 can include an SHA-256 cryptographic hash function 927, and/or an HMAC-SHA256 cryptographic hash function 929. SHA-256 and/or HMAC-SHA256 cryptographic hash functions 927 and 929 can be used by memory device 906 to generate cryptographic hashes, such as, for instance, the cryptographic hash of a command as previously described herein, and/or a golden hash used to validate data stored in memory arrays 901-1 through 901-7. Further, memory device 906 can support L0 and L1 of DICE-RIOT 931.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory; and
   a controller having circuitry to:
   receive a command that is included in a block in a block chain for validating commands to be executed on the memory, wherein the command includes an anti-replay portion that is based on a previous command included in a previous block in the block chain;
   compare the anti-replay portion of the command to an expected value for the anti-replay portion of the command;
   validate the command upon the comparison indicating the anti-replay portion of the command matches the expected value; and
   execute the command on the memory upon validating the command.

2. The apparatus of claim 1, wherein the expected value for the anti-replay portion of the command is a cryptographic hash of an anti-replay portion of the previous command.

3. The apparatus of claim 1, wherein the expected value for the anti-replay portion of the command is a digital signature for an anti-replay portion of the previous command.

4. The apparatus of claim 1, wherein the circuitry of the controller is to generate the expected value for the anti-replay portion of the command using an anti-replay portion of the previous command.

5. The apparatus of claim 1, wherein the circuitry of the controller is to generate the expected value for the anti-replay portion of the command using a secret key.

6. The apparatus of claim 1, wherein the circuitry of the controller is to send a command response to a host upon executing the command on the memory.

7. The apparatus of claim 1, wherein the circuitry of the controller is to:
receive an additional command that is included in a subsequent block in the block chain, wherein the additional command includes an anti-replay portion that is based on the command included in the block in the block chain;
compare the anti-replay portion of the additional command to an expected value for the anti-replay portion of the additional command;
validate the additional command upon the comparison indicating the anti-replay portion of the additional command matches the expected value; and
execute the additional command on the memory upon validating the additional command.

8. The apparatus of claim 1, wherein the controller is to not validate the command upon the comparison indicating the anti-replay portion of the command does not match the expected value.

9. A method of operating memory, comprising:
receiving a command from a host, wherein:
the command is included in a block in a block chain for validating commands to be executed on the memory; and
the command includes an anti-replay portion that is a cryptographic hash of an anti-replay portion of a previous command included in a previous block in the block chain;
validating the command using the anti-replay portion of the command; and
executing the command on the memory upon validating the command.

10. The method of claim 9, wherein the cryptographic hash comprises a SHA-256 cryptographic hash.

11. The method of claim 9, wherein the anti-replay portion of the previous command is stored in a register.

12. The method of claim 9, wherein validating the command using the anti-replay portion of the command includes comparing the anti-replay portion of the command to the cryptographic hash of the anti-replay portion of the previous command.

13. A method of operating memory, comprising:
generating an anti-replay portion for validating a command to be executed on the memory, wherein:
the command is included in a block in a block chain for validating commands to be executed on the memory; and
the anti-replay portion for validating the command is a signature for an anti-replay portion of a previous command included in a previous block in the block chain; and
sending the command having the anti-replay portion for validating the command to the memory.

14. The method of claim 13, wherein the signature is a digital signature.

15. The method of claim 14, wherein the digital signature comprises an elliptical curve digital signature.

16. The method of claim 13, wherein the signature is generated using asymmetric cryptography.

17. The method of claim 13, wherein the signature is generated using symmetric cryptography.

18. The method of claim 13, wherein the method includes:
receiving a result of an execution of the command on the memory; and
validating the result of the execution of the command on the memory using the anti-replay portion for validating the command.

19. The method of claim 13, wherein the method includes generating the anti-replay portion of the previous command from a random value.

20. The method of claim 13, wherein the method includes generating the anti-replay portion of the previous command responsive to a powering of the memory.

* * * * *